United States Patent
Chen et al.

(10) Patent No.: US 6,922,561 B2
(45) Date of Patent: Jul. 26, 2005

(54) METHOD AND APPARATUS FOR EFFICIENT PAGING AND REGISTRATION IN A WIRELESS COMMUNICATIONS NETWORK

(75) Inventors: An Mei Chen, San Diego, CA (US); Eric C. Rosen, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/300,490

(22) Filed: Nov. 19, 2002

(65) Prior Publication Data

US 2004/0203770 A1 Oct. 14, 2004

(51) Int. Cl.[7] .............................................. H04Q 7/20
(52) U.S. Cl. .................... 455/435.1; 455/453; 455/436; 370/331; 370/332
(58) Field of Search ....................... 455/435.1–3, 432.1, 455/434, 436–439, 458, 518–519, 453, 442–443, 446; 370/331, 332

(56) References Cited

U.S. PATENT DOCUMENTS

| | | | | |
|---|---|---|---|---|
| 5,361,396 A | * | 11/1994 | Onoe et al. ............. | 455/435.1 |
| 5,369,681 A | * | 11/1994 | Boudreau et al. ....... | 455/456.1 |
| 5,379,451 A | * | 1/1995 | Nakagoshi et al. ..... | 455/435.1 |
| 5,509,052 A | * | 4/1996 | Chia et al. .............. | 455/465 |
| 5,548,816 A | * | 8/1996 | DeVaney ................ | 455/456.2 |
| 5,613,201 A | * | 3/1997 | Alford et al. ........... | 455/18 |
| 5,678,180 A | * | 10/1997 | Mehta et al. ........... | 455/422.1 |
| 5,722,073 A | * | 2/1998 | Wallstedt et al. ....... | 455/437 |
| 5,734,984 A | * | 3/1998 | Reece et al. ............ | 455/458 |
| 5,854,981 A | * | 12/1998 | Wallstedt et al. ....... | 455/439 |
| 5,875,400 A | * | 2/1999 | Madhavapeddy et al. | 455/458 |
| 5,915,221 A | * | 6/1999 | Sawyer et al. .......... | 455/437 |
| 6,021,326 A | * | 2/2000 | Nguyen .................. | 455/422.1 |
| 6,181,933 B1 | | 1/2001 | Jeong ..................... | 455/432 |
| 6,219,548 B1 | * | 4/2001 | Feltner et al. .......... | 455/433 |
| 6,321,083 B1 | * | 11/2001 | Vaara et al. ............ | 455/446 |
| 6,405,050 B1 | * | 6/2002 | Amirijoo et al. ....... | 455/518 |
| 6,674,736 B1 | * | 1/2004 | Tiedemann, Jr. ........ | 370/332 |
| 6,687,237 B1 | * | 2/2004 | Lee et al. ............... | 370/331 |
| 6,778,833 B1 | * | 8/2004 | Fortuna .................. | 455/446 |
| 6,801,772 B1 | * | 10/2004 | Townend et al. ....... | 455/436 |

* cited by examiner

*Primary Examiner*—CongVan Tran
(74) *Attorney, Agent, or Firm*—Philip R. Wadsworth; Robert J. O'Connell; John L. Cicozzi

(57) ABSTRACT

Method and apparatus for optimizing registration and paging in a group communication system use mobility of the mobile stations to minimize the frequency of registrations performed by the mobile stations as well as the area of paging the mobile stations. When the mobile stations have a low mobility status, the base station reduces the area of paging the mobile stations so that the paging channel load is reduced.

8 Claims, 12 Drawing Sheets

METHOD AND APPARATUS FOR EFFICIENT PAGING AND REGISTRATION IN A WIRELESS COMMUNICATIONS NETWORK

FIELD

The present invention relates to point to multi-point communications systems. More specifically, the present invention relates to methods and apparatus for optimizing the frequency of registrations as well as the area of paging in a wireless group communication network.

BACKGROUND

In wireless communications systems, registration is the process by which the mobile station notifies the base station of its location, status, identification, slot cycle, and other characteristics. The mobile station informs the base station of its location and status so that the base station can efficiently page the mobile station when establishing a mobile station-terminated call. On the other hand, paging a mobile station includes the act of seeking the mobile station when a call is to be placed to that mobile station. To conserve system capacity, reduce service cost, and save battery life, it is desirable to minimize registration as well as paging channel load. However, the act of minimizing registration may be accompanied by a considerable increase in the paging area, and hence an increase in the paging channel load. Current registration and paging techniques are not optimized based on the mobility of the mobile stations.

For example, a class of wireless services intended for quick, efficient, one-to-one or one-to-many (group) communication has existed in various forms for many years. In general, these services have been half-duplex, where a user presses a "push-to-talk" (PTT) button on a phone/radio to initiate a group call. If granted the floor, the talker then generally speaks for a few seconds. After the talker releases the PTT button, other users may request the floor. These services have traditionally been used in applications where one person, a "dispatcher," needs to communicate with a group of people, such as field service personnel or taxi drivers, which is where the "dispatch" name for the service comes from. Similar services have been offered on the Internet and are generally known as "voice chat." A key feature of these services is that mobile stations participating in a group call generally tend to be of low mobility. Therefore, registration and paging may be optimized accordingly.

There is a need, therefore, for mechanisms to minimize registration without having to page in a wider area. There is also a need to optimize registration and paging of a group of mobile stations based on the mobility of the mobile stations.

SUMMARY

The disclosed embodiments provide novel and improved methods and apparatus for optimizing registration and paging of mobile stations in a wireless communication network. In one aspect, a method in a mobile station (MS) for registering the MS with a base station (BS) includes the steps of determining the number of cells identified in a first list and registering the MS with the BS, if the number of cells identified in the first list is equal to a predetermined limit.

In one aspect, a method for paging a target mobile station (MS) includes the steps of receiving information destined for a target MS and paging the target MS at a paging area that is centered at a cell, in which the target MS last registered, and expands by a predefined number of cells around the cell.

In another aspect, an apparatus for paging a target mobile station (MS) includes a memory unit, a receiver, a transmitter, and a processor communicatively coupled with the memory unit, the receiver, and the transmitter. The processor is capable of executing instructions to carry out the above-mentioned methods.

BRIEF DESCRIPTION OF THE DRAWINGS

The features and advantages of the present invention will become more apparent from the detailed description of the embodiments in connection with the drawings set forth below.

DETAILED DESCRIPTION

Figure 1:
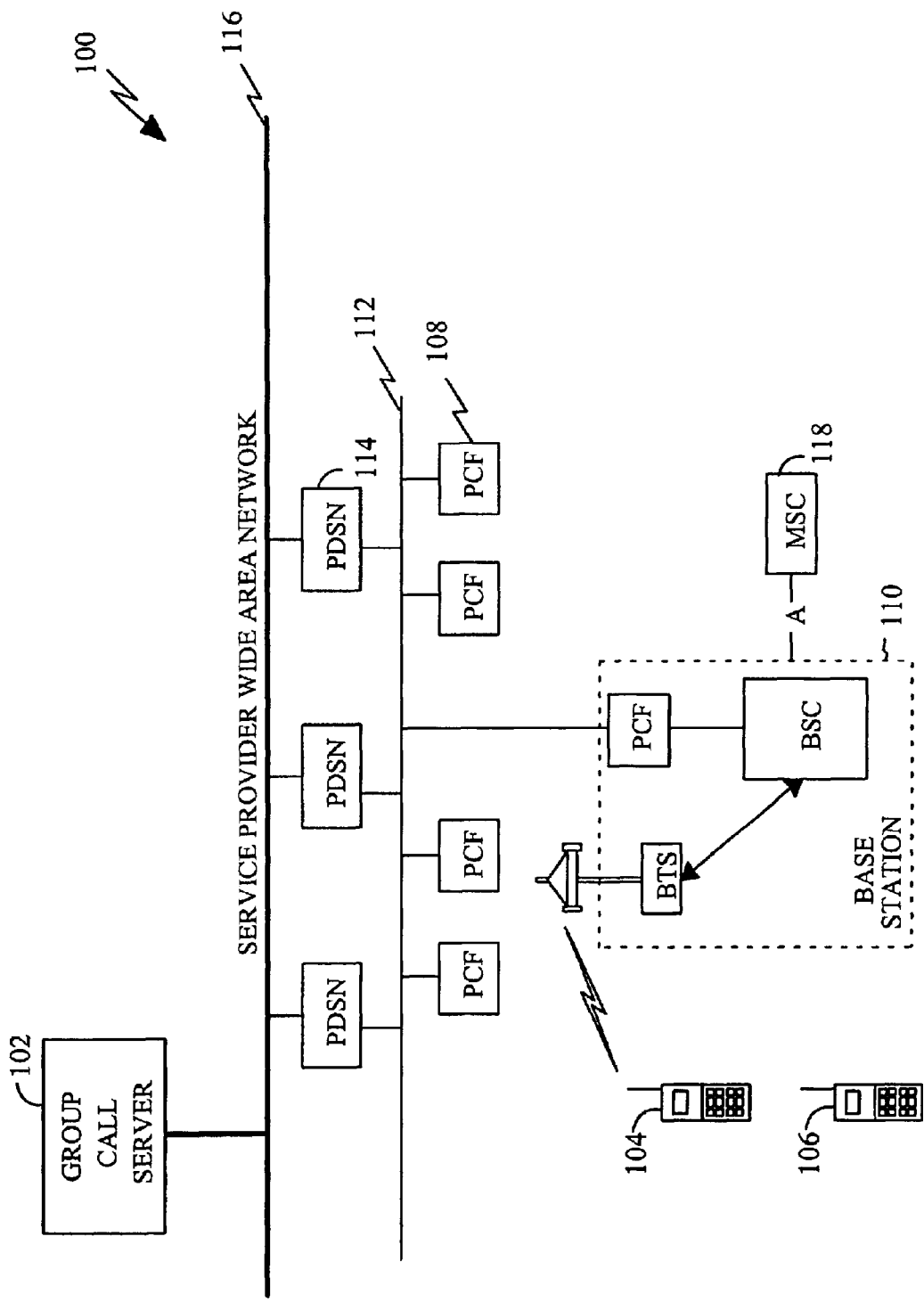
FIG. 1 illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting.

FIG. 1 illustrates a functional block diagram of a group communication system 100, for implementing one embodiment. Group communication system 100 is also known as a push-to-talk (PTT) system, a net broadcast service (NBS), a dispatch system, or a point-to-multi-point communication system. In one embodiment, group communication system 100 includes a group call server 102, which may be deployed in either a centralized deployment or a regionalized deployment.

Group mobile stations (MSs) 104 and 106, which may be deployed such as cdma2000 handset, for example, may request packet data sessions using a data service option. Each MS may use the session to register its Internet Protocol (IP) address with the group call server 102 to perform group call initiations. In one embodiment, group call server 102 is connected to the service provider's packet data service nodes (PDSNs) 114 through service provider's network 116. Mobile stations 104 and 106, upon requesting packet data sessions from the wireless infrastructure, may have IP connectivity to group call server 102 through the PDSNs 114. Each PDSN may interface to a base station controller (BSC) through a packet control function (PCF) 108 and a network 112. The PCF may be co-located with the BSC within a base station (BS) 110. A number of BSCs may be connected to a mobile station controller (MSC) 118.

A packet data service node may fall in one of several states, e.g., active or connected state, dormant state, and null or inactive state. In the active or connected state, an active traffic channel exists between the participating MS and the BS or BSC, and either side may send data. In the dormant state, no active traffic channel exists between the participating MS and the BSC, but a point-to-point protocol (PPP) link is maintained between the participating MS and the PDSN. In the null or inactive state, there is no active traffic channel between the participating MS and the BSC, and no PPP link is maintained between the participating MS and the PDSN.

After powering up, mobile stations 104 and 106 may request packet data sessions. As part of establishing a packet data session, each MS may be assigned an IP address. Each MS may perform a registration process to notify group call server 102 of the MS's IP address. Registration may be performed using an IP protocol, such as session initiation protocol (SIP) over user datagram protocol (UDP). The IP address of a MS may be used to contact the MS when the corresponding user is invited into a group call.

Once a group call is established, mobile stations 104 and 106 and group call server 102 may exchange media and signaling messages. In one embodiment, media may be exchanged between the participating mobile stations and the group call server by using real-time protocol (RTP) over UDP. The signaling messages may also be exchanged by using a signaling protocol over UDP.

Group communication system 100 performs several different functions in order to provide group call services. The functions that relate to the user side include user registration, group call initiation, group call termination, sending alerts to group participants, late join to a group call, talker arbitration, adding members to a group, removing members from a group, un-registering a member, and user and/or device authentication. The functions that relate to system preparation and operation include administration and provisioning, scalability, and reliability. These functions are described in detail in the copending patent application, U.S. patent application Ser. No. 10/076,726, filed Feb. 14, 2002, which is assigned to the same assignee and incorporated herein by reference in its entirety.

Figure 2:
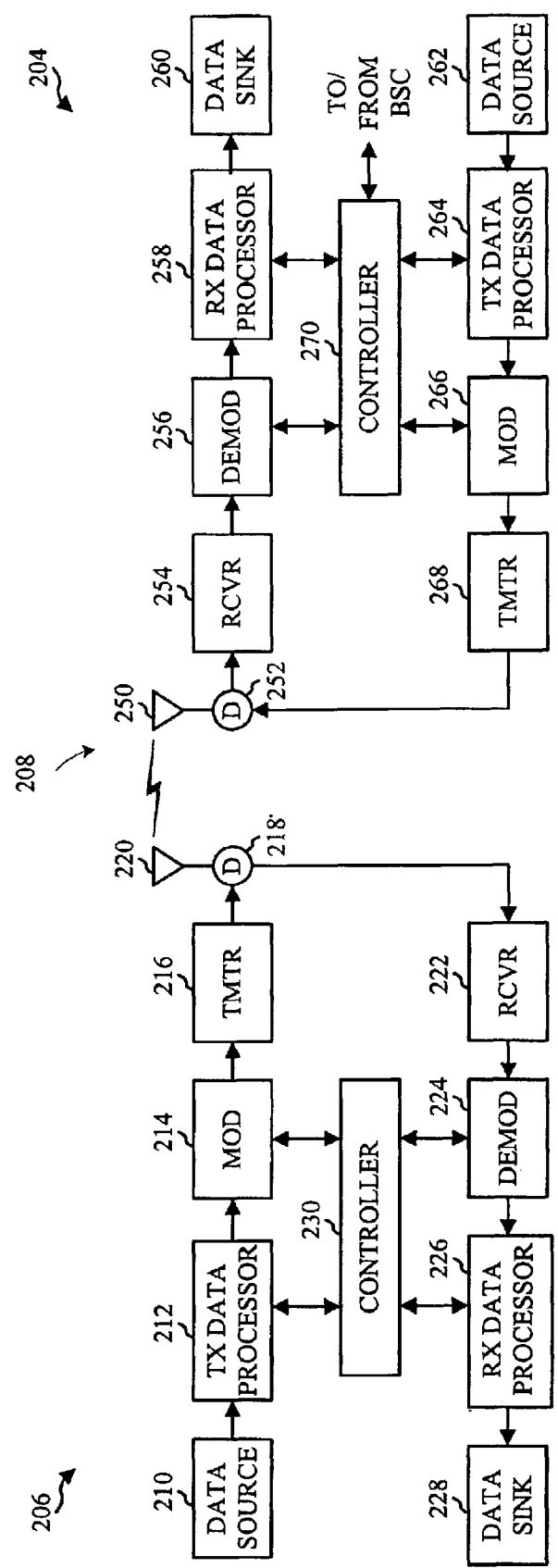
FIG. 2 illustrates an embodiment for a base station and a mobile station operating in FIG. 1.

FIG. 2 is a simplified block diagram of an embodiment of base station 204 and mobile station 206, which are capable of implementing various disclosed embodiments. For a particular communication, voice data, packet data, and/or messages may be exchanged between base station 204 and mobile station 206, via an air interface 208. Various types of messages may be transmitted, such as messages used to establish a communication session between the base station and mobile station, registration and paging messages, and messages used to control a data transmission (e.g., power control, data rate information, acknowledgment, and so on). Some of these message types are described in further detail below.

For the reverse link, at mobile station 206, voice and/or packet data (e.g., from a data source 210) and messages (e.g., from a controller 230) are provided to a transmit (TX) data processor 212, which formats and encodes the data and messages with one or more coding schemes to generate coded data. Each coding scheme may include any combination of cyclic redundancy check (CRC), convolutional, turbo, block, and other coding, or no coding at all. The voice data, packet data, and messages may be coded using different schemes, and different types of messages may be coded differently.

The coded data is then provided to a modulator (MOD) 214 and further processed (e.g., covered, spread with short PN sequences, and scrambled with a long PN sequence assigned to the user terminal). The modulated data is then provided to a transmitter unit (TMTR) 216 and conditioned (e.g., converted to one or more analog signals, amplified, filtered, and quadrature modulated) to generate a reverse link signal. The reverse link signal is routed through a duplexer (D) 218 and transmitted via an antenna 220 to base station 204.

At base station 204, the reverse link signal is received by an antenna 250, routed through a duplexer 252, and provided to a receiver unit (RCVR) 254. Base station 204 may receive registration information and status information, e.g., mobile station mobility rate, from mobile station 206. Receiver unit 254 conditions (e.g., filters, amplifies, down converts, and digitizes) the received signal and provides samples. A demodulator (DEMOD) 256 receives and processes (e.g., despreads, decovers, and pilot demodulates) the samples to provide recovered symbols. Demodulator 256 may implement a rake receiver that processes multiple instances of the received signal and generates combined symbols. A receive (RX) data processor 258 then decodes the symbols to recover the data and messages transmitted on the reverse link. The recovered voice/packet data is provided to a data sink 260 and the recovered messages may be provided to a controller 270. Controller 270 may include instructions for determining a paging area, paging a group of mobile stations, and sending information to the mobile stations. The processing by demodulator 256 and RX data processor 258 are complementary to that performed at mobile station 206. Demodulator 256 and RX data processor 258 may further be operated to process multiple transmissions received via multiple channels, e.g., a reverse fundamental channel (R-FCH) and a reverse supplemental channel (R-SCH). Also, transmissions may be simultaneously from multiple mobile stations, each of which may be transmitting on a reverse fundamental channel, a reverse supplemental channel, or both.

On the forward link, at base station 204, voice and/or packet data (e.g., from a data source 262) and messages (e.g., from controller 270) are processed (e.g., formatted and encoded) by a transmit (TX) data processor 264, further processed (e.g., covered and spread) by a modulator (MOD) 266, and conditioned (e.g., converted to analog signals, amplified, filtered, and quadrature modulated) by a transmitter unit (TMTR) 268 to generate a forward link signal. The forward link signal is routed through duplexer 252 and transmitted via antenna 250 to mobile station 206. Forward link signals include paging signals.

At mobile station 206, the forward link signal is received by antenna 220, routed through duplexer 218, and provided to a receiver unit 222. Receiver unit 222 conditions (e.g., down converts, filters, amplifies, quadrature modulates, and digitizes) the received signal and provides samples. The samples are processed (e.g., despreaded, decovered, and pilot demodulated) by a demodulator 224 to provide symbols, and the symbols are further processed (e.g., decoded and checked) by a receive data processor 226 to recover the data and messages transmitted on the forward link. The recovered data is provided to a data sink 228, and the recovered messages may be provided to controller 230. Controller 230 may include instructions for determining the number of pilot signals in an active set, adding new pilots in the active set, moving pilot signals from a list to another list, registering mobile station 206, and providing the registration information to the base station 204.

The group call service (GCS) may allow one user to talk to a group of users in a half-duplex or full-duplex mode. In the former case, because only one person may be permitted to talk at a time, the permission to talk may be moderated by the infrastructure. In such systems, a user may request permission to talk by pressing a "push-to-talk" button (PTT), for example. The system may arbitrate the requests received from multiple users and, through a contention-resolution process, the system may choose one of the requestors according to a predetermined algorithm. The system may then notify the chosen user that the user has permission to talk. The system may transparently dispatch the user's traffic information, such as voice and/or data, from the authorized talker to the rest of the group members, who may be considered "listeners." The voice and/or data traffic in GCS may be different from the classical one-to-one phone call, and a priority may be placed on some conversations.

Figure 3:
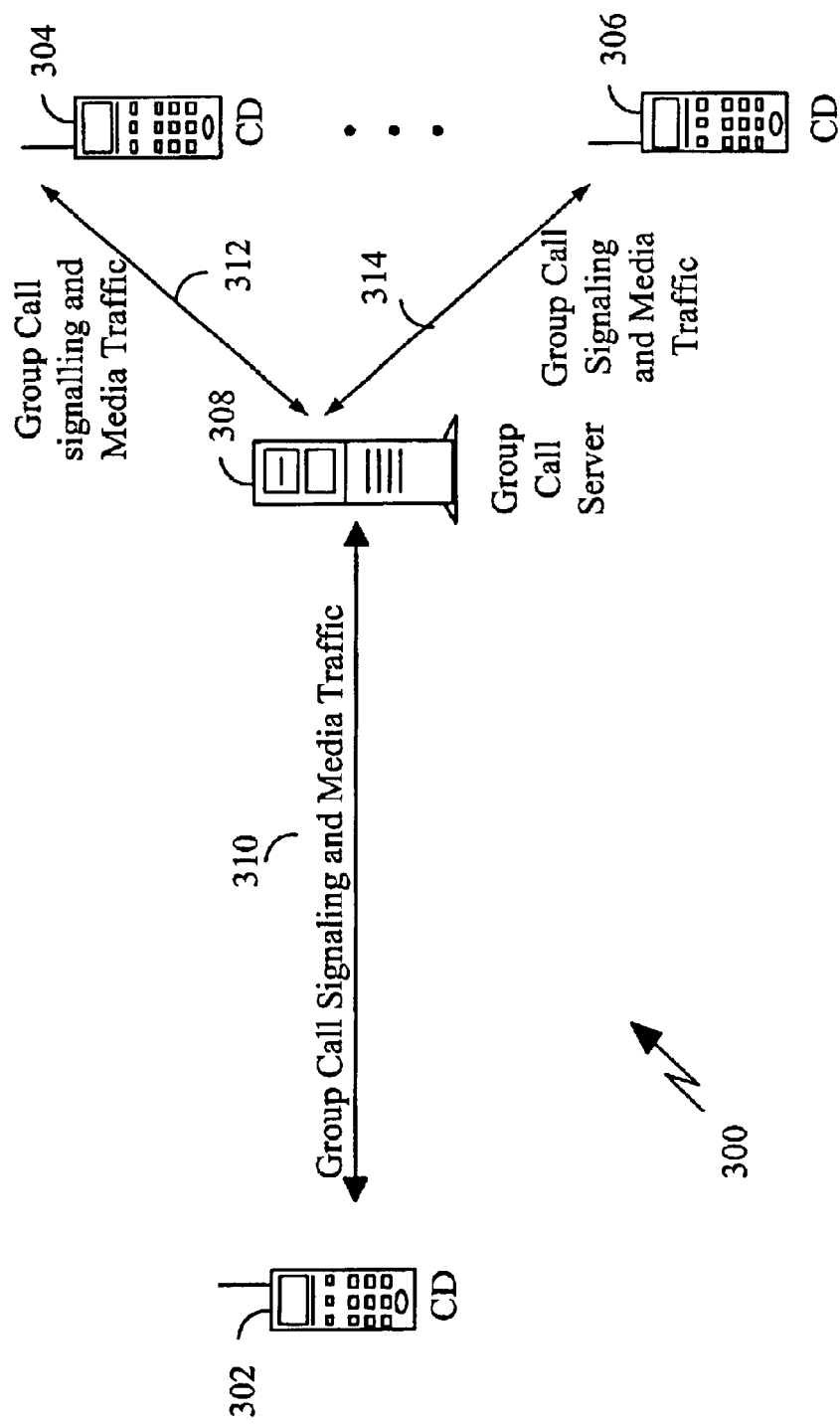
FIG. 3 illustrates how several mobile stations interact with a group call server.

FIG. 3 illustrates a group call arrangement for showing how mobile stations (MSs) 302, 304, and 306 interact with a group call server 308. Multiple group call servers may be deployed as desired for large-scale groups. In FIG. 3, when MS 302 has permission to transmit media to other members of the group, MS 302 is known as the talker and may transmit media over an established channel. When MS 302 is designated as the talker, the remaining participants, MS 304 and MS 306, may not have permission to transmit media to the group. Accordingly, MS 304 and MS 306 are designated as listeners. As described above, MSs 302, 304, and 306 are connected to group call server 308, using at least one channel. In one embodiment, channels 310, 312, and 314 may include a session initiation protocol (SIP) channel, a media-signaling channel, and a media traffic channel.

Figure 4:
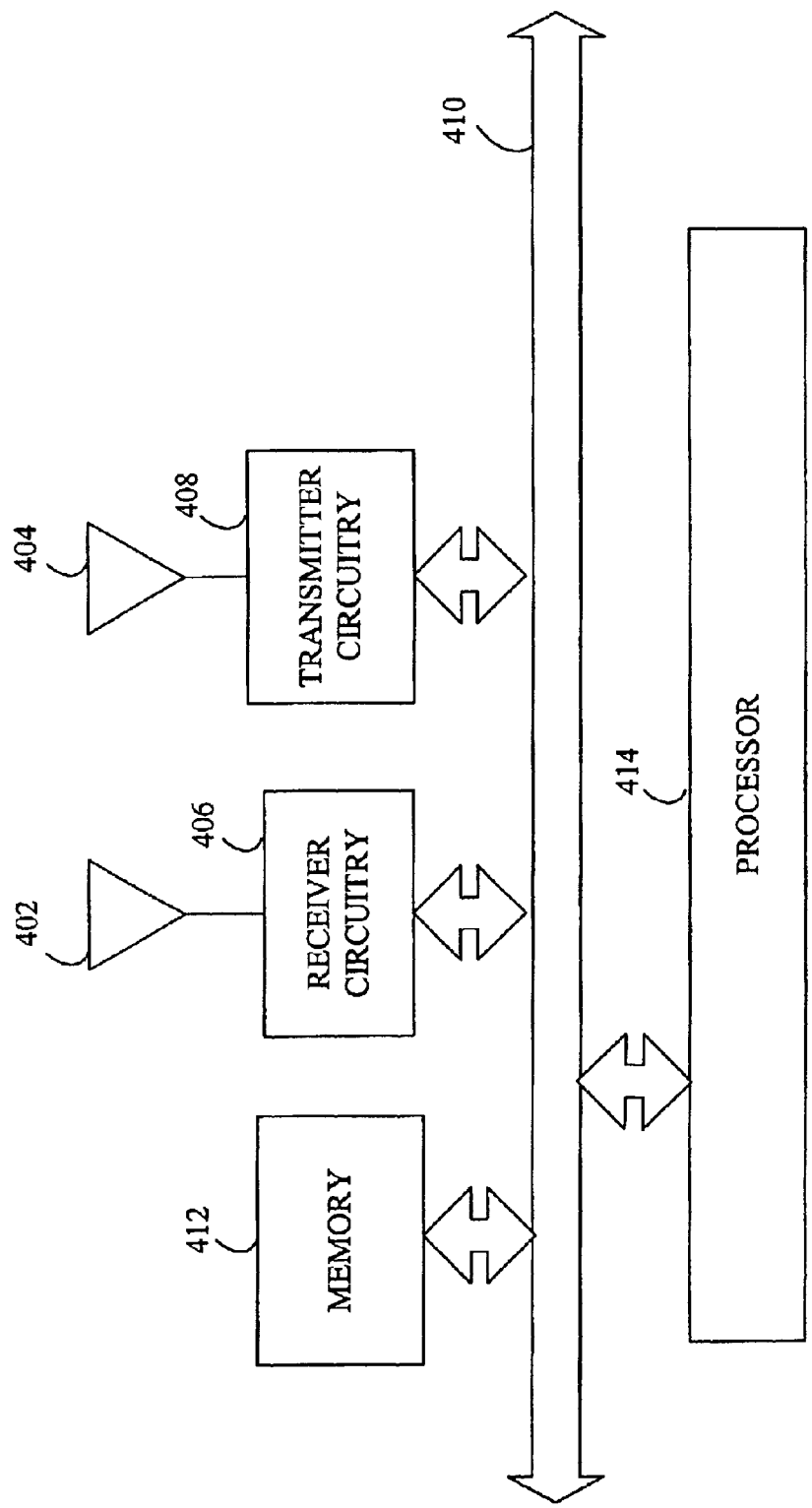
FIG. 4 illustrates an embodiment for a group call server in FIG. 1.

FIG. 4 illustrates one embodiment for the group call server 102 operating in the system of FIG. 1. The group call server includes antennas 402, 404 for transmitting and receiving data. Antenna 402 is coupled to the receiver circuitry 406 and antenna 404 is coupled to the transmit circuitry 408. Communication bus 410 provides a common connection among other modules in FIG. 4. Communication bus 410 is further coupled to memory unit 412. Memory 412 stores computer readable instructions for a variety of operations and functions performed by the group call server. The processor 414 performs the instructions stored in memory 412.

Figure 5:
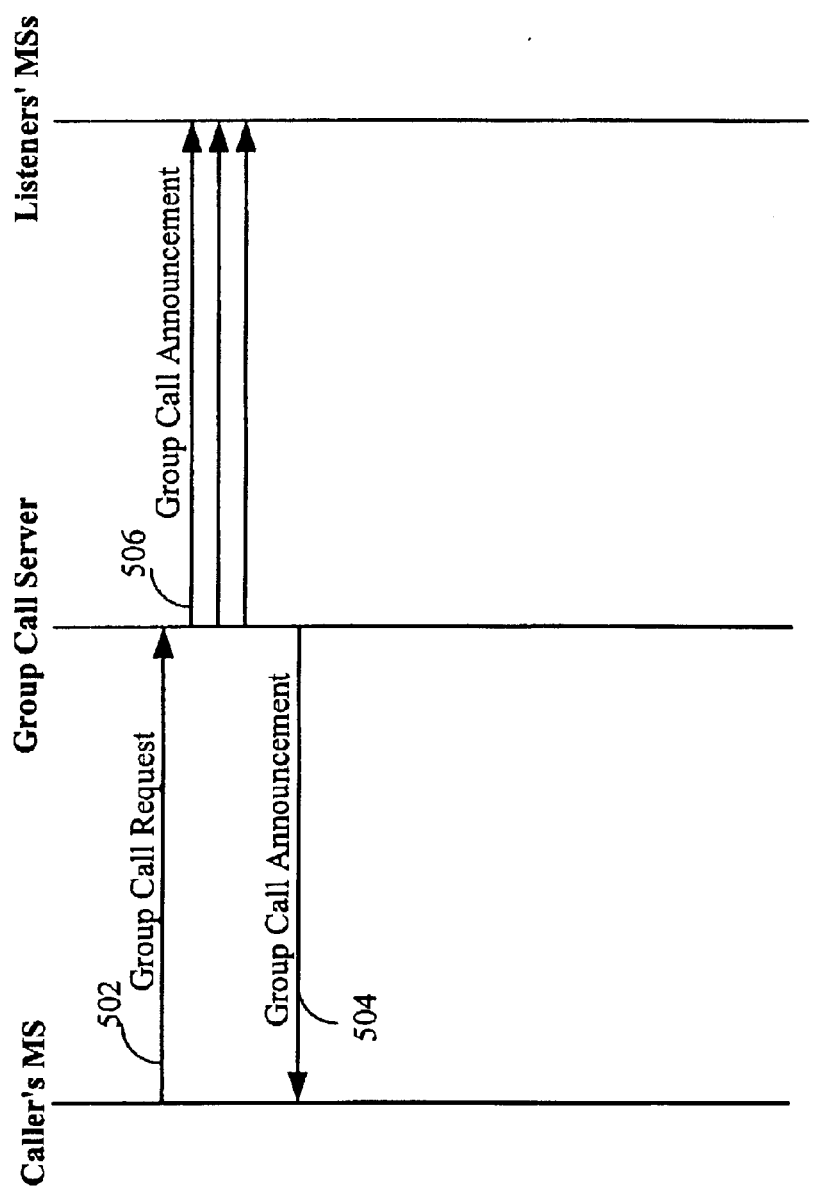
FIG. 5 illustrates a call-setup process.

FIG. 5 illustrates a message-flow diagram showing a group call setup, according to one embodiment. A user who wishes to initiate a group call selects one or more target users, one or more pre-defined groups, or a combination of the two and may depress the push-to-talk (PTT) button on a MS. The caller's MS may be in a dormant packet data session when the caller initiates the group call. The caller's MS then sends a group call request 502 to the group call server to setup the group call. The group call request may be transmitted regardless of whether the caller's MS has a dedicated traffic channel or not. After the group call request is sent, if the caller's MS is in dormant packet data session, the caller's MS initiates the process of re-establishing its dedicated traffic channel and prepare the packet data session for media activity.

When the group call server receives the group call request, the group call server expands the pre-defined groups, if any is specified in the received group call request, into a list of group members. The group call server retrieves location information for the desired group members. The group call server also determines if the target group is already running in the system.

After the group call server locates at least one of the group members, the group call server sends an announcement 504 back to the caller's MS indicating that the group call is being set up. At this point, the caller's MS optimistically grants the caller's request to talk. The caller's MS starts buffering the received media for future transmission to the group call server. The group call server uses the location information of the target listeners' mobile stations to send out announcements 506 to the target listeners' Mobile stations. Sending the announcements triggers the packet data sessions of the target listeners' mobile stations to come out of dormancy and to re-establish their traffic channels.

The "instant response" relates to the response time it takes for the group call server to respond to a PTT or group call request. The goal for responding to the PTT or group call request is to consistently respond to the request within a predetermined time period, e.g., one second or less. In many cases, when a caller requests to setup a group call, the caller's packet data session is dormant, meaning that no dedicated traffic channel exists. Re-establishing dedicated traffic channels may take considerable time.

In one embodiment, group communication system 100 (FIG. 1) supports both chat-room and ad-hoc models for group call services. In the chat-room model, groups are predefined, which may be stored on the group call server. The predefined groups, or nets, may be public, implying that the group has an open member list. In this case, each group member is a potential participant in a group call. The group call is started when a first group member starts to initiate a group call. The call remains running for a pre-determined time period, which may be configured by the service provider. During a group call, the group members may specifically request to join or leave the call. During periods of talk inactivity, the group call may be brought into a group dormant state until a group member requests permission to talk. When operating in the chat-room model, group members, also known as net members, communicate with one another using a mobile station assigned to each net member. The term "net" denotes a group of members authorized to communicate with each other.

In the ad-hoc model of group call services, however, groups may be defined in real-time and have a closed member list associated with each group. A closed member list may specify which members are allowed to participate in the group call. The member list may not be available to others outside of the closed member list, and may only exist for the life of the call. Ad-hoc group definitions may not be stored in the group call server. The definitions may be used to establish the group call and released after the call has ended. An ad-hoc group may be formed when a caller selects one or more target members and generates a group call request, which is sent to the group call server to start the call. The group call server may send a notification to the target group members that they have been included in the group. The group call server may automatically join the target members into the group call, i.e., no action may be required from the target members. When an ad-hoc call becomes inactive, the group communication server may "tear down" the call and free the resources assigned to the group, including the group definition used to start the call.

Network-originated Call-signaling Messages

In one embodiment, after receiving the floor-control request, the group call server may burst media-signaling messages to a group of dormant target Mobile stations and trigger the dormant target Mobile stations to re-establish their dedicated traffic channels. In one embodiment, the packet control function (PCF) receives a small amount of information, e.g., packet data, from the packet data serving node (PDSN), which may be destined for a dormant target MS. The PCF may choose to send the information to the base station controller (BSC) in a special form. In one embodiment, the special form includes short data burst (SDB) format, as specified in the TIA/EIA/IS-707-A-2, "Data Service Option Standard for Spread Spectrum Systems," Addendum 2, dated June 2000 (IS-707-A-2). The TIA/EIA/IS-2001-A, "Interoperability Specification (IOS) for cdma2000 Access Network Interfaces," dated August 2001 (IS-2001-A) standard defines several options for the BSC to deliver SDB messages to target Mobile stations.

According to the IS-2001-A standard, for example, when a small amount of data destined for a dormant target MS is received at the PCF, the PCF may choose to send the received data to the BSC in SDB format. If the BSC determines that short data bursts may be used to deliver the data to the dormant target MS, the BSC may send the data directly to the dormant target MS over a signaling channel. The BSC may also send the data to the MSC for delivery to the dormant target MS via an application data delivery service (ADDS) Page. The data may be delivered to the MSC using a BSC service request/response procedure. If the BSC is unsuccessful in delivering the SDB data to the dormant target MS on its own, the BSC may choose to send the data to the MSC for delivery to the dormant target MS via the ADDS Page procedure.

Figure 6:
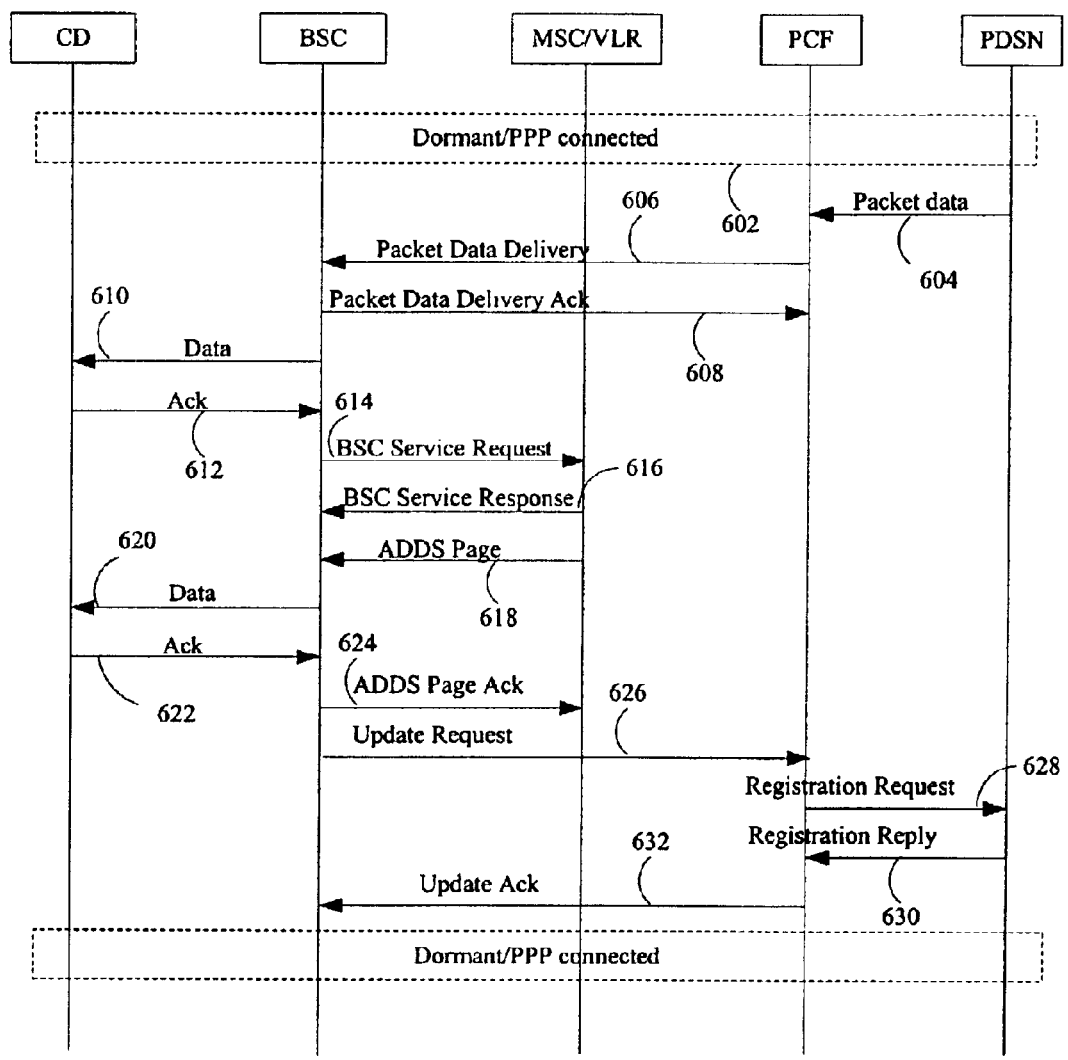
FIG. 6 illustrates call-signaling details for a network-initiated information delivery process.

FIG. 6 shows a call-flow procedure for delivering data to a target MS, according to one embodiment. The packet data session is in the dormant state 602 with PPP connected. The PDSN sends packet data 604 to the PCF on the existing PPP connection associated with the target MS. The PCF sends the packet data 606 to the BSC. The PCF also buffers the packet data. The BSC acknowledges receiving the data packets from the PCF by returning an acknowledge message 608, which includes an indication that the BSC attempts to send the data to the target MS. The PCF then discards the data that it had buffered.

The BSC sends the packet data directly to the target MS or, alternatively, the BSC uses an ADDS Page procedure to deliver the packet data, e.g., in SDB form, to the target MS. If the BSC directly sends the packet data 610 to the target MS, the target MS sends an acknowledgement 612 in response to receiving the data. If an acknowledgement is not received from the target MS, the BSC may choose not to send the packet data or may request the MSC to deliver the packet data via ADDS Page procedure.

If the BSC could not successfully send the packet data 610 to the target MS, the BSC sends a "BSC service request" 614, which contains the packet data, to the MSC. The MSC acknowledges receiving the BSC service request message by sending a "BSC service response" 616 to the BSC. The MSC then sends an ADDS Page message 618 to the BSC for delivering the packet data to the target MS. If the MSC sends the packet data, the MSC specifies the "data type field" in the ADDS Page to "SDB." The ADDS Page message contains the location information for the target MS. Accordingly, the BSC forwards the data 620, e.g., in SDB form, to the target MS. The target MS sends an acknowledgement message 622 after receiving the data from the BSC. If the MSC had requested in the ADDS Page message, the BSC returns an ADDS Page acknowledgement message 624 to the MSC, after receiving the acknowledgement message from the target MS. The BSC also sends an update message 626 to the PCF to indicate successful transmission of the data to the target MS. The PCF responds 628 to the BSC with an update acknowledge message. The PCF sends a registration request 630 to the PDSN, which responds with a registration reply message 632.

Having the BSC directly deliver the packet data to the target MS may minimize the delay, but the target MS may not receive the data because the target MS may have moved out of the BSC's paging area by the time the data arrive. Since the MSC maintains location information for the target MS, the ADDS Page data delivery process ensures that the target MS receives the data. In one embodiment, the BSC may cache location information for the target MS, which may be used by the BSC when there is data destined for the target MS. Using the location information cached at the BSC eliminates the delay due to having the BSC to request the MSC to send the ADDS Page. This process provides assured delivery of the data to the target MS based on the saved location information.

Figure 7:
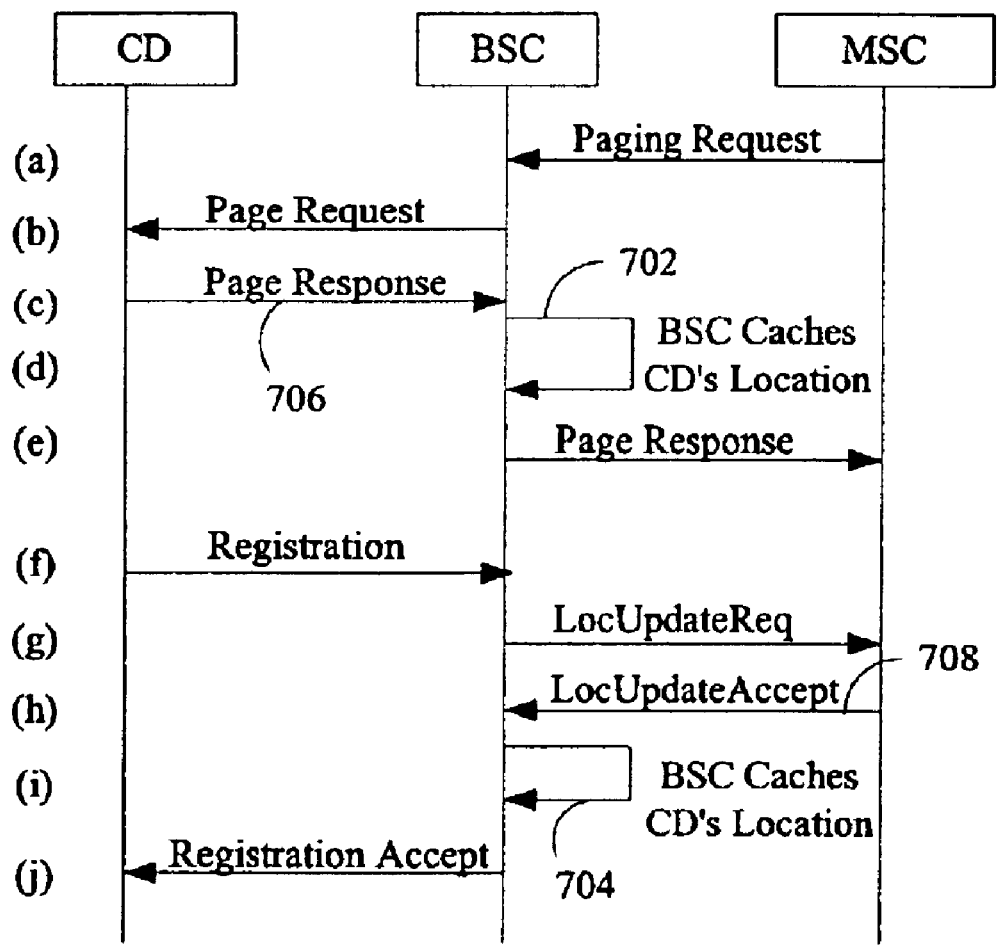
FIG. 7 illustrates a process for buffering location information for mobile stations.

On embodiment of cashing location information for the mobile stations is illustrated in FIG. 7. The BSC caches 702, 704 the target MS's location information after the BSC receives a page response 706 from the target MS or receives a "location update accept" message 708 from the MSC. The page response message received from the target MS may include a cell identifier field that specifies the location, e.g., a cell location area code (LAC), of the target MS. In one embodiment, the BSC may obtain the target MS's location information from the target MS's registration message. For example, there are several different types of registration defined by the TIA/EIA/IS-2000.5-A, "Upper Layer (Layer 3) Signaling Standard for cdma2000 Spread Spectrum Systems," dated November 2000 (IS-2000 standard). Any of these registration types may provide the BSC information about the location of the target MS. The BSC may update the cached location information if the BSC receives a page response, a registration response, an origination message, or other signaling messages that provide the current location information for the target MS.

Network Configurations

Each PCF in the network may be uniquely identified by a system identification/network identification/packet zone identification (SID/NID/PZID) code. When the target MS moves from one PCF to another PCF, i.e., PCF to PCF handoff, during the dormant packet data session, the target MS may be required to re-register to have the PDSN establish an interface with the new PCF and terminate the existing connection with the old PCF.

Figure 8:
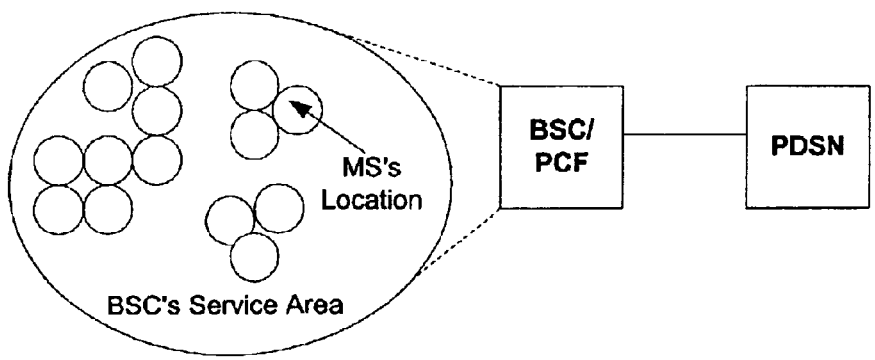
FIG. 8 illustrates a configuration for a group communication network.

In one embodiment, as shown in FIG. 8, the BSC and the PCF are co-located. When a packet data arrives at the PCF and the PCF decides to send the packet data, the target MS may most probably be under the service area of the same BSC. Otherwise, the target MS would have been required to re-register and a new connection would have been established with a different PCF.

Figure 9:
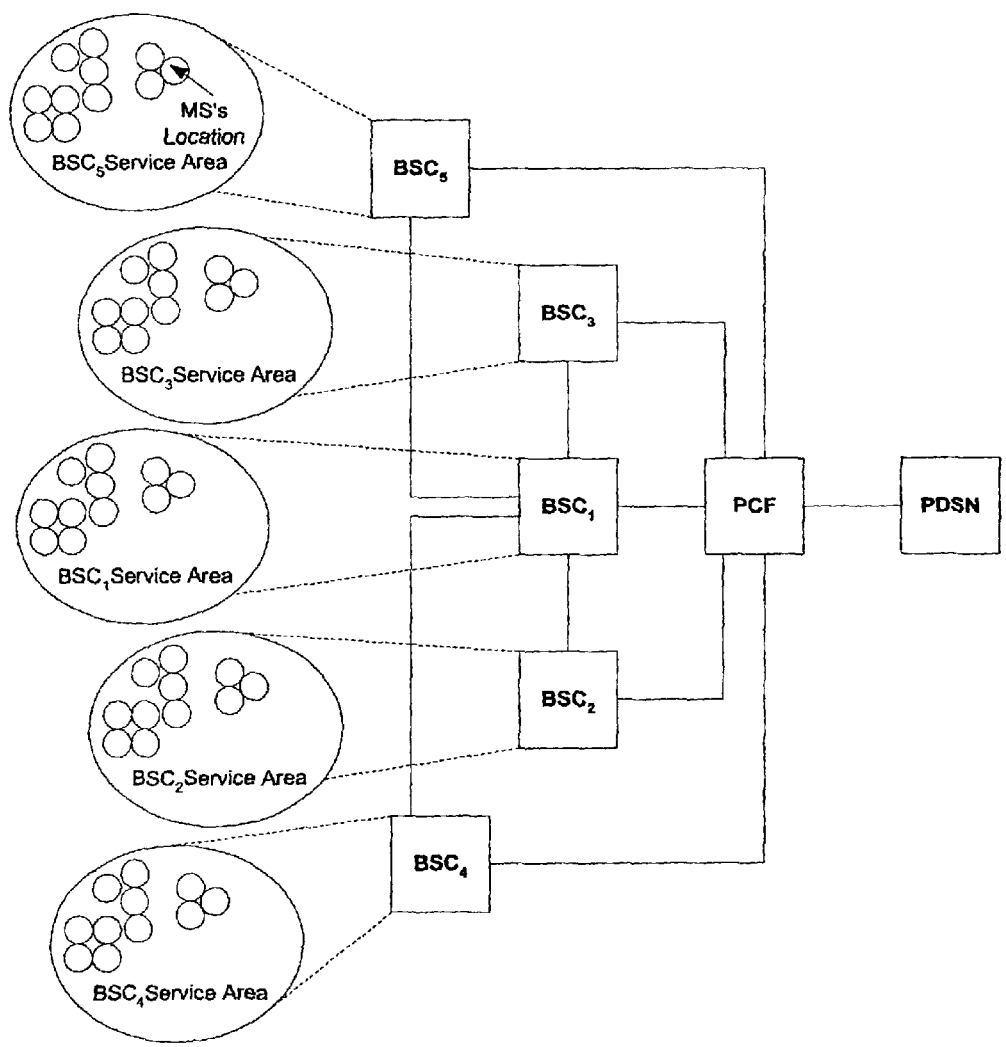
FIG. 9 illustrates an alternative configuration for a group communication network.

In one embodiment, as shown in FIG. 9, the BSC and the PCF are not co-located. In FIG. 9, $BSC_1$ is shown to be fully interconnected with other BSCs that are connected to the same PCF. The BSCs that are connected to the same PCF may be interconnected either via point-to-point link or via a switching network. Unlike the scenario where the BSC and the PCF are co-located, when the PCF sends data to $BSC_1$, $BSC_1$ may fail in delivering the data to the target MS because the target MS may have moved outside the service area of $BSC_1$ to another BSC's service area. In FIG. 9, for example, the target MS may have been in the service area of $BSC_1$ before the packet data session goes dormant, and may have moved to the service area of $BSC_5$ when $BSC_1$ receives the request from the PCF to deliver data to the target MS.

In one embodiment, where the PCF may be co-located with the BSC, the BSC receives the packet data for transmission to a target MS, which may be dormant. The BSC may broadcast the packet data to the cells and/or sectors within the BSC's service area. Alternatively, to decrease air-link resource consumption, the BSC may utilize the target MS's location information, which may have been already cached at the BSC, to broadcast the data to a subset of cells and/or sectors under the BSC's control.

Figure 10:
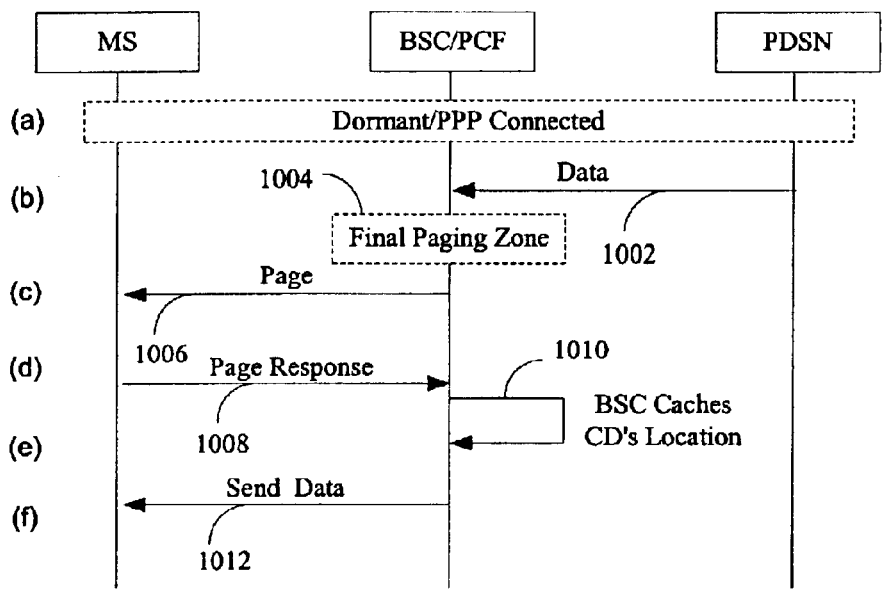
FIG. 10 illustrates a network-initiated information delivery process.

In one embodiment, where the PCF may be co-located with the BSC, as shown in FIG. 10, the BSC receives the packet data 1002 from the PDSN for delivery to a target MS. Before the BSC sends the packet data 1002 to the target MS, the BSC first buffers the packet data. The BSC then determines 1004 a paging zone for paging the target MS, as will be described in more detail herein later. The BSC then sends out a page message 1006 based on the determined paging zone under the BSC's service area. If the target MS's identification information, such as the matching mobile identification number (MIN) or electronic serial number (ESN), matches with the identification information specified in the paging message, the MS sends a paging response 1008 to the BSC. The paging response provides information about the cell and/or sector the target MS is located in, which allows the BSC to send the packet data to the identified cell and/or sector only. The BSC caches 1010 the target MS's location information before sending the packet data 1012 to the target MS. The cached location information may be refreshed by the next page response, registration response, origination message, or other signaling messages that provide location information for the target MS. The cached location information may be aged out by a timer.

Cell-based Registration Scheme

Registration is the process by which the MS notifies the base station of its location, status, identification, slot cycle, and other characteristics. The MS informs the base station of its location and status so that the base station can efficiently page the MS when establishing a MS-terminated call. While the MS is in idle state, the MS may perform registration when an idle handoff occurs. An idle handoff occurs when a MS has moved from the coverage area of one base station into the coverage area of another base station during the MS idle state. If the MS detects a pilot channel signal from another base station that is sufficiently stronger than that of the current base station, the MS determines that an idle handoff should occur.

Idle handoff is the act of transferring reception of the paging channel, broadcast control channel or the forward common control channel from one base station to another base station, when the MS is in the idle state. The MS in an idle state determines that an idle handoff is needed if the pilot signal strength of the new cell is certain decibels greater than the pilot signal in its Active Set.

When the MS transits from other states to the idle state, the MS may initialize two lists of cells. The first list is named CURRENT_CELL_LIST and the second list is named PREV_CELL_LIST. As the MS performs an idle handoff, the mobile station adds the new cell's identification information to the CURRENT_CELL_LIST if the new cell is not already identified in the list. The MS may obtain the new cell's information by listening to the broadcasted overhead messages.

In one embodiment, if the number of cells in the CURRENT_CELL_LIST list reaches a predetermined limit, e.g., MAX_NUM_CELLS, the MS performs a registration and copies the entries in the CURRENT_CELL_LIST, except the last entry, into the PREV_CELL_LIST. Thus, the size of the PREV_CELL_LIST is equal to the predetermined limit, e.g., MAX_NUM_CELLS, less one.

Figure 11:
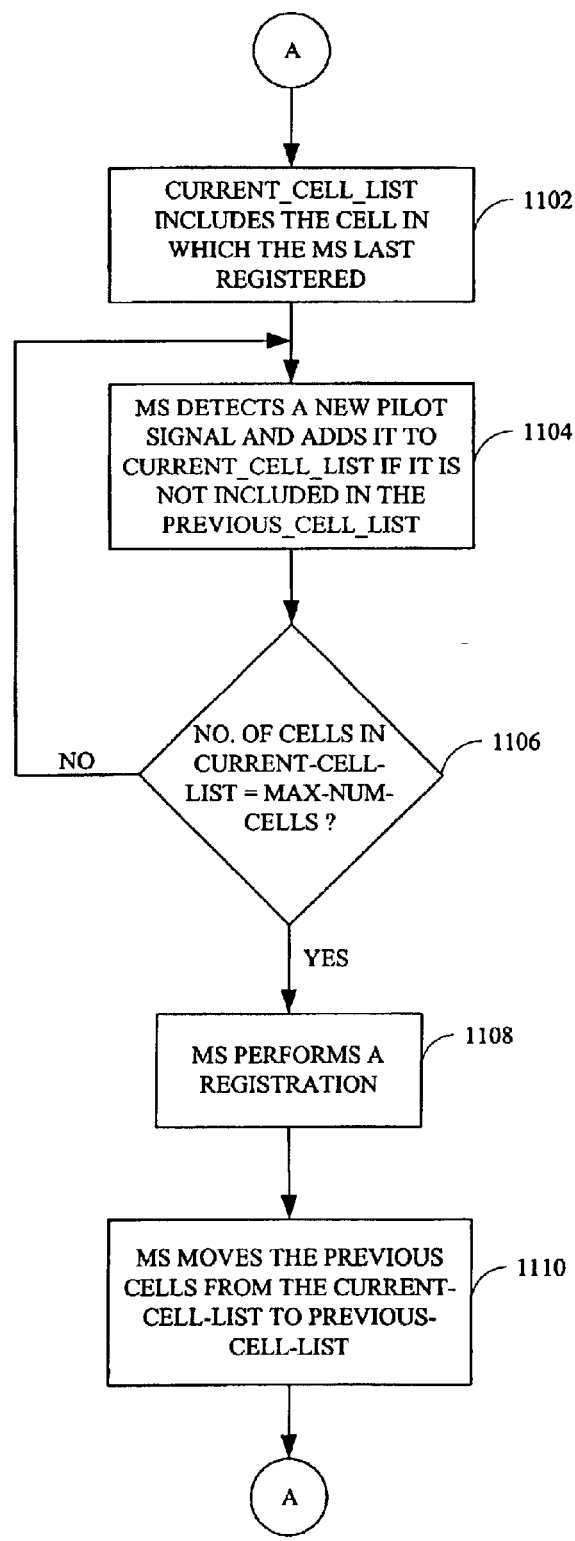
FIG. 11 illustrates a registration process.

FIG. 11 illustrates a registration process, according to one embodiment. The CURRENT_CELL_LIST includes at least the identification information of the cell in which the MS last registered, 1102. As the MS detects a new pilot signal that may be added to the active set, the MS adds the identification information of the new cell in the CURRENT_CELL_LIST, in step 1104, if the cell is not already identified in the CURRENT_CELL_LIST. In step 1106, the MS determines whether the number of cells identified in the CURRENT_CELL_LIST has reached the predetermined limit, e.g., MAX_NUM_CELLS. If the number of cells in the CURRENT_CELL_LIST has reached the predetermined limit, the MS performs a registration, in step 1108, and moves the identification information of the cells in the CURRENT_CELL_LIST, except the last entered cell in which the MS registered, to the PREV_CELL_LIST, in step 1110.

Figure 12:
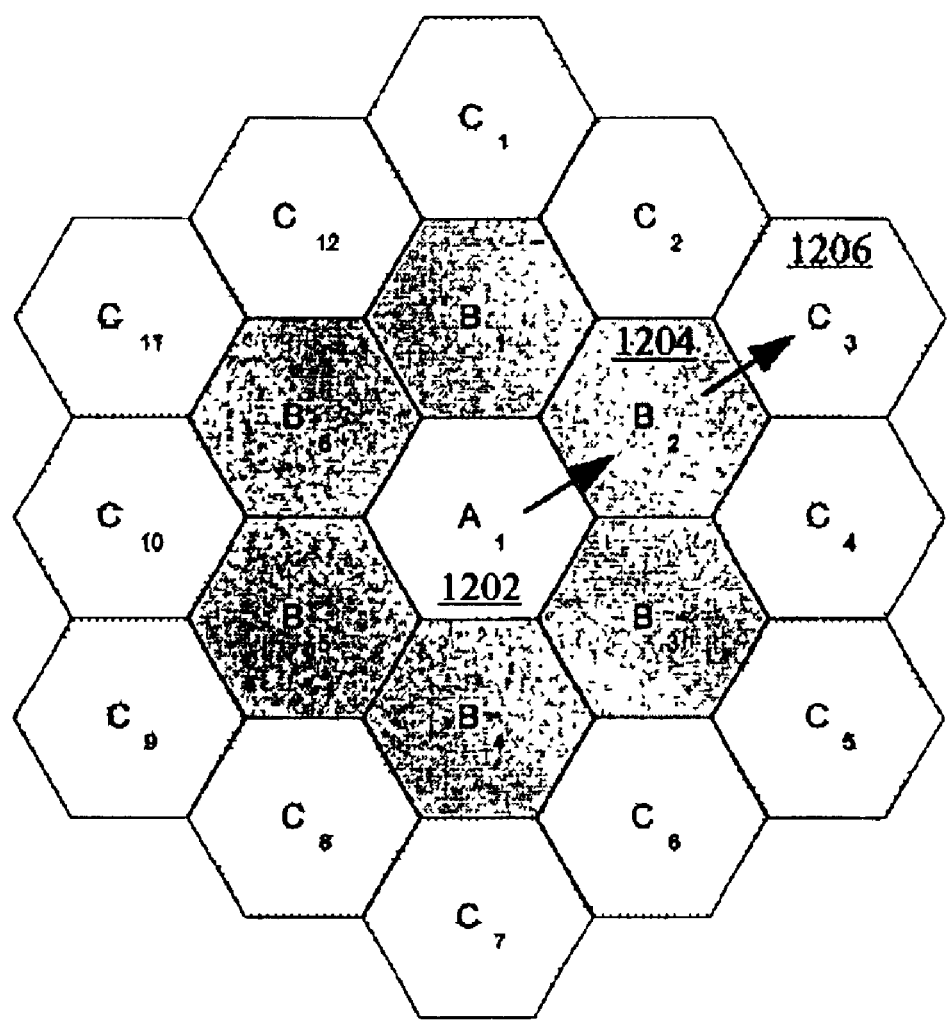
FIG. 12 illustrates a cell layout.

In one embodiment, the cell layout is shown as in FIG. 12. Letting the predetermined limit, MAX_NUM_CELLS, to be three and the MS's trajectory from cell to cell to be A1→B2→C3, and assuming the cell in which the mobile last registered is A1, 1202, the CURRENT_CELL_LIST would contain cell {A1}. After the MS detects the pilot signal of cell B2, 1204, and adds cell B2 to the CURRENT_CELL_LIST, the latter contains cells {A1, B2}. As the MS moves toward cell C3, 1206, the MS detects and adds cell C3 to the CURRENT_CELL_LIST, which now contains cells {A1, B2, C3}. Now, since the number of cells identified in the CURRENT_CELL_LIST equals the predetermined limit, e.g., three, the MS performs a registration with the network and moves the cells {A1, B2} from the CURRENT_CELL_LIST to the PREVIOUS_CELL_LIST.

Paging a mobile station includes the act of seeking the mobile station when a call is to be placed to that mobile station. To conserve system capacity, reduce service cost, and save battery life, it is desirable to minimize paging area to reduce the paging channel load. The paging area may be configured, e.g., predefined or dynamically determined, for a given BSC. The paging area may be different for different BSCs. The BSC pages the target MS in the configured paging area. If the target MS cannot be located in the configured paging area of the BSC, the data may be sent to a neighboring BSC for delivering to the target MS. Therefore, each BSC need not to unnecessarily page in a large area. If the target MS cannot be located in the paging area of the BSCs connected to a mobile station controller (MSC), the data may be sent to the MSC for delivering to the target MS, if the MSC could locate the target MS.

Figure 13:
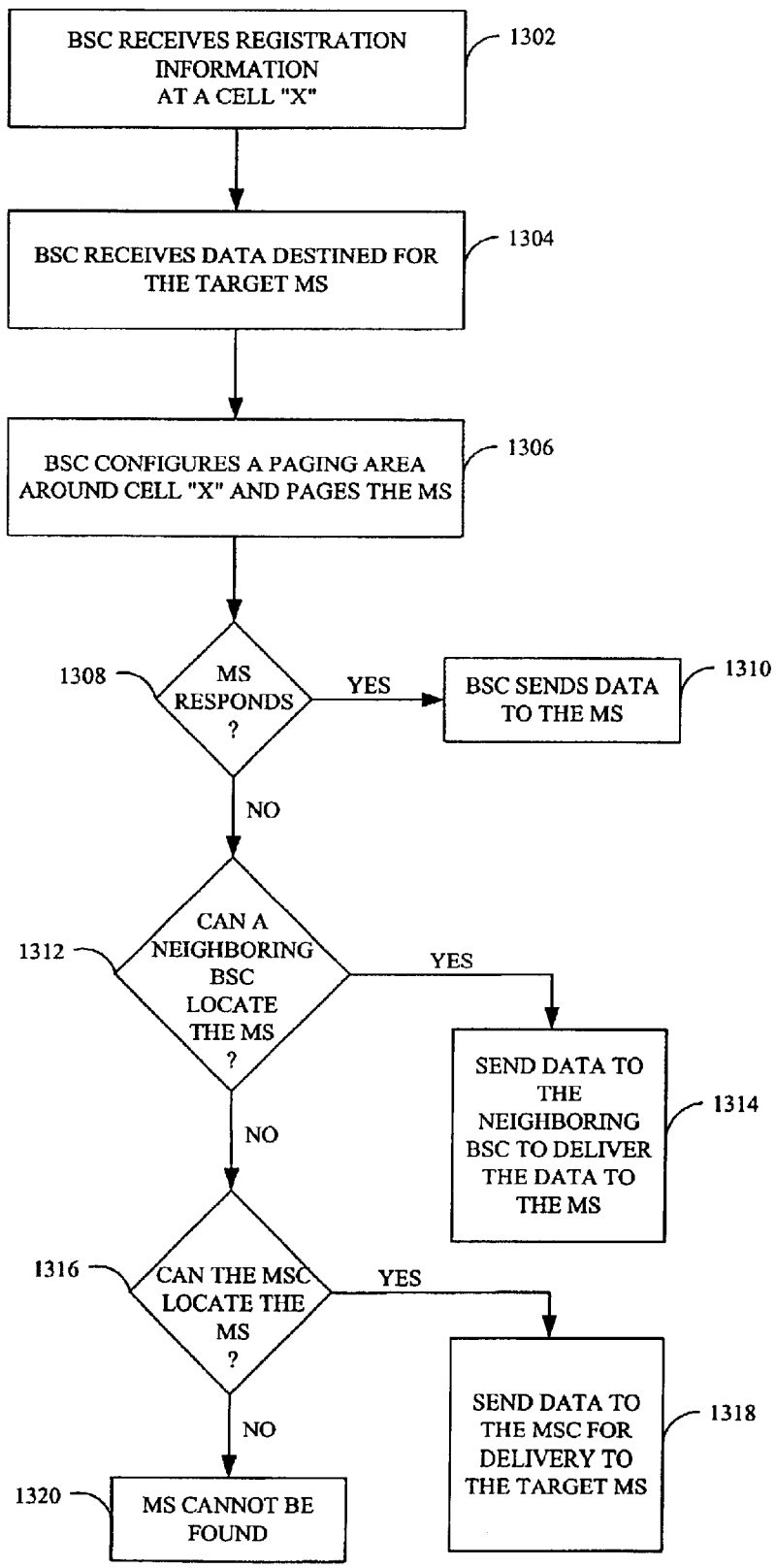
FIG. 13 illustrates a paging process.

FIG. 13 shows a paging scheme, according to one embodiment. In step 1302, the BSC receives registration information from the target MS, which is located in the cell X. When the BSC receives information, e.g., data, voice, image, text, video, or any combination thereof, for delivery to the target MS, in step 1304, the BSC pages the target MS based on a paging area, which may be a predefined area or a dynamically determined area. In step 1306, the BSC configures the paging area based on a certain number of cells from or around the cell in which the target MS last registered. For example, the paging area may include the cells that fall within an area that is centered at cell X and extended by a predetermined number of cells, e.g., MAX_NUM_CELLS less one.

After the BSC pages the target MS based on the configured paging area, the BSC waits for a paging response from the target MS, in step 1308. If the BSC could locate the target MS from the paging response, the BSC sends the information destined for the target MS to the target MS, in step 1310. However, if the BSC could not locate the target MS from the paging response, the BSC requests a neighboring BSC to locate the target MS, which may be by the same paging scheme discussed above. If the neighboring BSC locates the target MS, in step 1312, the BSC sends the information destined for the target MS to the neighboring BSC for delivery to the target MS, in step 1314.

If none of the BSCs connected to the MSC could locate the target MS, the MSC is requested to locate the target MS, which may be based on a flood paging scheme. If the MSC locates the target MS, in step 1316, the BSC holding the information destined for the target sends the information to the MSC to for delivery to the target MS, in step 1318. In case the MSC could not locate the target MS, the MS may not be found due to being turned off or being out of service 1320.

For example, letting the trajectory of the target MS from cell to cell to be "A→B→C→D→E→D→C→B→F," the predetermined limit, e.g., MAX_NUM_CELLS, to be three, and assuming the cell in which the MS last registered is cell A, the CURRENT_CELL_LIST would contain cell {A}. After the MS detects and adds cell B to the CURRENT_CELL_LIST, the latter contains cells {A, B}. As the MS moves toward cell C, the MS detects and adds cell C to the CURRENT_CELL_LIST, making it to contain now cells {A, B, C}. Since the number of cells in the CURRENT_CELL_LIST equals to the predetermined limit, e.g., 3, the MS performs a registration in cell C and moves cells {A, B} from the CURRENT_CELL_LIST to the PREVIOUS_CELL_LIST.

As the MS moves through cell D, and then to cell E, the MS adds cells D and E to the CURRENT_CELL_LIST, making it to contain now cells {C, D, E}. Since the number of cells in the CURRENT_CELL_LIST equals the predetermined limit, e.g., three, the MS performs a registration in cell E and moves cells {C, D} from the CURRENT_CELL_LIST to the PREVIOUS_CELL_LIST.

As the MS moves back to cell D, and then to C, the MS does not add cells D and C to the CURRENT_CELL_LIST, because these cells are already included in current PREVIOUS_CELL_LIST. However, when the MS moves back to cell B, the MS adds the identification information of the cell B to the CURRENT_CELL_LIST, because cell B is not included in the PREVIOUS_CELL_LIST, which now includes cells C and D.

As the MS moves through a new cell F, the MS detects and adds cell F to the CURRENT_CELL_LIST, which now contains cells {E, B, F}. Since the number of cells in the CURRENT_CELL_LIST equals the predetermined limit of three, e.g., MAX_NUM_CELLS, the MS performs a registration in cell F and moves cells {E, B} from the CURRENT_CELL_LIST to the PREVIOUS_CELL_LIST.

In one embodiment, where the PCF may not be co-located with the BSC, the BSC receives a request from the PCF to send the packet data to the target MS. The BSC determines if the BSC has cached location information for the target MS. If the BSC had cached location information for the target MS, which allows the BSC to perform assured data delivery, the BSC sends the data to the target MS, according to the cached location information. Otherwise, if the BSC did not have location information for the target MS, the BSC may send a page message to a predetermined paging zone to locate the target MS. If BSC could locate the target MS, the BSC then sends the data received from the PCF to the target MS. However, if the BSC could not locate the target MS in the predetermined paging zone, the BSC may send the data to a neighboring BSC, which may be connected to the same MSC, so that one of the neighboring BSCs that has location information for the target MS, or can locate the target MS, transmits the information to the target MS. The BSC that has cached location information for the target MS, or can locate the target MS, delivers the data to the target MS. If no BSC has location information for the target MS, nor can locate the target MS, the data may be sent to the MSC to be delivered to the target MS, e.g., via flood paging. The MSC may not locate the target MS, due to the target MS being turned off or out of service. Therefore, the disclosed embodiments provide for a significant reduction in the number of registrations as well as the paging area, thus saving battery life and paging channel load.

Those of skill in the art would understand that information and signals may be represented using any of a variety of different technologies and protocols. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a MS-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein.

What is claimed is:

1. A method in a mobile station (MS) for registering the MS with a base station (BS), the method comprising:

determining a number of cells identified in a first list;

registering the MS with the BS if the number of cells identified in the first list is equal to a predetermined limit; and moving the cells identified in the first list, other than a cell in which the MS last registered, to a second list, after said registering the MS.

2. The method of claim 1, further including adding a cell, whose pilot signal's strength is higher than or equal to a predetermined threshold, to the first list if the cell is not already included in the second list.

3. An apparatus for registering a mobile station (MS) with a base station (BS), comprising:

means for determining a number of cells identified in a first list;

means for registering the MS with the BS if the number of cells identified in the first list is equal to a predetermined limit; and means for moving the cells identified in the first list, other than a cell in which the MS last registered, to a second list, after said registering the MS.

4. The apparatus of claim 3, further including means for adding a cell, whose pilot signal's strength is higher than or equal to a predetermined threshold, to the first list if the cell is not already included in the second list.

5. A computer-readable medium storing codes for enabling a processor to perform a method for registering a mobile station (MS) with a base station (BS), the method comprising:

determining a number of cells identified in a first list;

registering the MS with the BS if the number of cells identified in the first list is equal to a predetermined limit; and moving the cells identified in the first list, other than a cell in which the MS last registered, to a second list, after said registering the MS.

6. The computer-readable medium of claim 5, the method further including adding a cell, whose pilot signal's strength is higher than or equal to a predetermined threshold, to the first list if the cell is not already included in the second list.

7. A method in a mobile station (MS) comprising:

a receiver capable of receiving information from a base station (BS);

a transmitter capable of transmitting information to the BS; and a processor capable of carrying out a method for registering the MS with a base station (BS), the method comprising:

determining a number of cells identified in a first list;

registering the MS with the BS if the number of cells identified in the first list is equal to a predetermined limit; and moving the cells identified in the first list, other than a cell in which the MS last registered, to a second list, after said registering the MS.

8. The MS of claim 7, the method further including adding a cell, whose pilot signal's strength is higher than or equal to a predetermined threshold, to the first list if the cell is not already included in the second list.

* * * * *